May 12, 1931.  A. T. SMITH  1,805,192

TESTING DEVICE FOR CENTRIFUGAL SWITCHES

Filed Feb. 23, 1929  2 Sheets-Sheet 1

INVENTOR
Aurile T. Smith
BY
Rector, Hibben, Davis & Macauley
ATTORNEYS

Patented May 12, 1931

1,805,192

UNITED STATES PATENT OFFICE

AURILE T. SMITH, OF DETROIT, MICHIGAN, ASSIGNOR TO BURROUGHS ADDING MACHINE COMPANY, OF DETROIT, MICHIGAN, A CORPORATION OF MICHIGAN

TESTING DEVICE FOR CENTRIFUGAL SWITCHES

Application filed February 23, 1929. Serial No. 342,110.

This invention relates to a testing device for centrifugal switches.

Its general object is to provide an improved testing device for such switches, particularly one that will enable switches to be tested in a rapid, simple, and inexpensive manner.

Other objects and advantages of the invention will appear from the following specification and drawings.

An embodiment of the invention is shown in the accompanying drawings in which.

Centrifugal switches are employed in numerous ways where it is desired to open or close a circuit at predetermined speeds. The switches usually have some sort of movable members that are responsive to the speed of rotation of the device that is to be controlled. These switch members are thrown outwardly by centrifugal force and, at the proper speed, they operate to control a switch, or clutch, to start or stop the device that is to be controlled.

Figure 1:
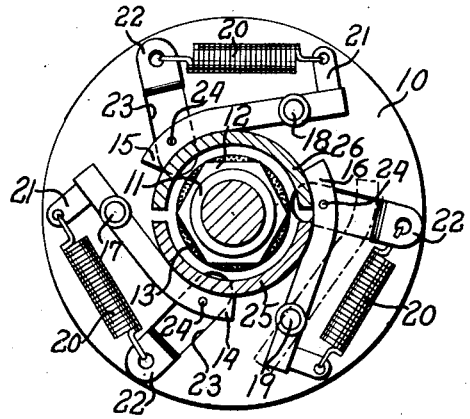
Figure 1 is a front elevation of a centrifugal switch of a type than can be tested by the invention disclosed, the switch being shown in the environment in which it is used.
Figure 3:
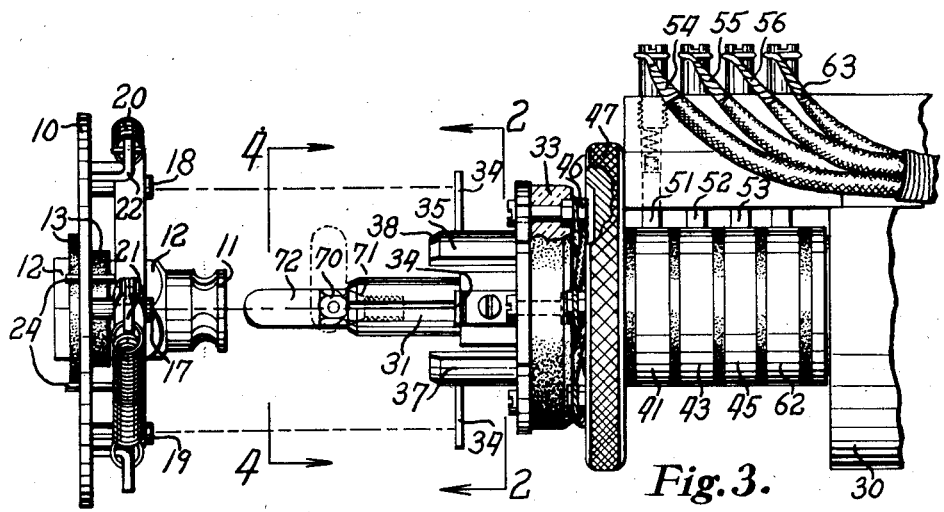
Fig. 3 is a side elevation of a portion of the testing device showing a switch in position to be put on the tester.

A switch of this type used in starting induction motors is illustrated in Fig. 1, the same switch being illustrated in side elevation in Fig. 3. It includes a base plate 10 mounted rigidly on a sleeve 11, by means of nuts 12 the plate and sleeve being insulated by the washers 13. Mounted equidistantly about the base plate are three switch arms 14, 15 and 16, the arms being pivoted respectively on the pivots 17, 18 and 19. Each arm is urged counterclockwise by its respective spring 20, one end of each spring being connected to a lug 21 on its switch arm and the other end being connected to a lug 22 struck out of the metal of the base plate so as to leave a slot 23 in said plate. Projecting from each of the switch arms is a stud 24, each stud extending into its respective slot 23 and acting to limit the movement of its switch arm in a counterclockwse direction by striking the bottom of its respective slot.

When the switch is used for starting an induction motor its sleeve 11 is rigidly mounted on the rotor shaft of the motor so that the base plate 10 and its switch arms rotate with the rotor. The purpose of the switch is to control the starting circuit of the motor and, in order to do this the switch arms 14, 15 and 16 are arranged to cooperate with two arcuate contacts 25 and 26 (Fig. 1) which are insulated from one another and which are in the starting circuit of the motor. The switch arms 14, 15 and 16 are shaped to fit these contacts and as the switch revolves the arms travel over the outside surface of the contacts. The arms are spaced so that two of the three arms ride on the contacts 25 and 26 at all times so as to maintain the starting circuit closed as long as the switch arms are in engagement with the contacts. Accordingly, when the circuit of the motor is closed for starting it, current travels through the starting circuit and rotation of the motor begins. After the speed of the motor has increased to a predetermined amount, it is desired to open the starting circuit and this is accomplished by a swinging of the contacts 14, 15 and 16 away from the contacts 25 and 26, under centrifugal action when the speed of the motor reaches a predetermined amount.

Although switches of this type are designed to operate at a given speed. inaccuracies in manufacture and adjustment make it quite likely that some of the switch arms will not throw out at the proper speed. It will be readily appreciated that if one of the arms throws out too soon the starting circuit will be interrupted for a portion of the time which will not interfere with the starting of the motor by slowing it down, but may prevent it getting up sufficient speed to get started at all. If two or more of the switch members should remain in engagement with the contacts 25 and 26 and not be thrown out, the starting coils of the motor would soon burn out as they are not made to carry the starting current for any considerable length of time.

Inasmuch as these switches are made to operate at a relatively high speed, it is impossible to observe when the switch contacts operate and it is highly desirable that some means be provided for quickly and easily testing the switches after they are assembled so that, before the switch is used, it may be definitely known that its arms will all operate at the proper determined speed. The present invention is directed to a device for accomplishing this result.

Figure 2:
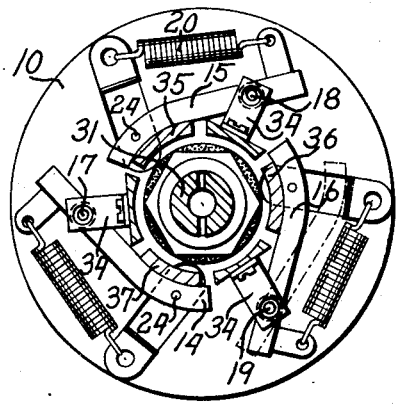
Fig. 2 is an elevation and section of a switch in position on the testing device, the view being taken on the line 2—2 of Fig. 3 looking in the direction of the arrows.
Figure 4:
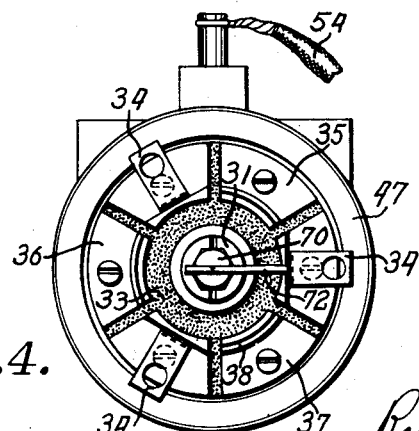
Fig. 4 is a sectional front elevation on the line 4—4 of Fig. 3 looking in the direction of the arrows.

Referring to Fig. 3, the testing device includes an electric motor 30 driving a shaft 31 upon which the switch to be tested is temporarily mounted. The motor is provided with a controller 32 (Fig. 5) by means of which it may be started and its speed gradually increased to an amount sufficient to throw out any of the switches that may be tested. Fixed to the shaft 31 is a disk 33 of insulating material upon which are mounted three L-shaped electrical contacts 34 (Fig. 2) spaced at equal distances about the disk and insulated from one another so that each contact constitutes a separate electrical terminal. Also mounted on the disk are three arcuate segments 35, 36 and 37 each of which is insulated from the other and from the contacts 34. These segments are spaced at equal distances about the disk and are preferably mounted between the contacts 34 as illustrated in Fig. 4. They project out from the face of disk 33 and their outer peripheries, if extended, to make a circle, would make a circle of the same diameter as the contacts 25 and 26 (Fig. 1) on the induction motor with which the switch is to be used. It will be observed that the outer ends of the segments 35, 36, and 37 are chamfered at 38 for a purpose that will presently appear.

Figure 5:
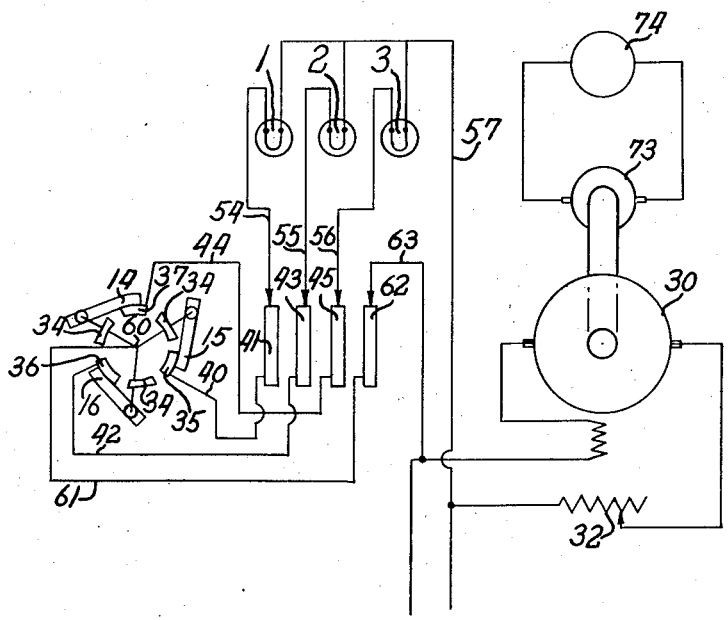
Fig. 5 is a diagrammatic view showing particularly the electrical circuits employed in the testing device.

The segments 35, 36 and 37 are separately connected to individual slip rings mounted on the motor shaft 31 as illustrated in Fig. 3. The connections are shown in Fig. 5 where it will be observed that the segment 35 is connected by the conductor 40 to the slip ring 41, the segment 36 is connected by the conductor 42 to the slip ring 43 and the segment 37 is connected by the conductor 44 to the slip ring 45. These connections are actually made on the testing device as illustrated in Fig. 3 through the medium of binding posts 46 on the disk 33, but it will be understood that the exact manner of making the electrical connections can be varied to suit the requirements. A knurled disk 47 is provided on the armature shaft to enable it to be easily held while a switch is being put in position for testing.

The respective slip rings 41, 43 and 45 have brushes 51, 52 and 53 (Fig. 3) bearing on their outer surfaces to which are connected respectively conductors 54, 55 and 56 (Fig. 5) leading to indicating devices in the form of electric lamp bulbs numbered 1, 2 and 3 in Fig. 5. The other sides of the circuits of these bulbs are connected to a common conductor 57 which, in turn, is connected to one side of the supply circuit.

The three electrical contacts 34 are connected at 60 (Fig. 5) to a common conductor 61 that is connected to a fourth slip ring 62 on the shaft 31. This slip ring is connected by a conductor 63 to the other side of the supply circuit.

The switch to be tested may be very quickly and easily placed on the testing device by slipping it over the end of the shaft 31, the outer end of the shaft being split and tapered as illustrated in Fig. 3 and being threaded internally to receive an expansion bolt 70. After the switch is slipped onto the shaft the bolt 70 is screwed into the shaft until the beveled portion 71 of the bolt engages the interior beveled end of the shaft and expands it to hold the switch in position. A pivoted finger piece 72 is provided to assist in tightening the bolt 70. At the time the switch is placed on the testing device the three switch arms, 14, 15 and 16 occupy their extreme counterclockwise positions with the studs 24 in contact with the bottom of the slots 23. As the switch slips onto the testing device the chamfered ends 38 of the segments 35, 36 and 37 engage the inside edges of the switch arms and the arms are forced outward slightly to enable them to slip over the segments with which they are held in engagement by their springs 20. The contacts 34 are positioned so that they engage the ends of the pivot pins 17, 18 and 19, the alignment of the part being shown by the dot and dash lines in Fig. 3. Accordingly, whenever a switch is placed on the testing device, each of the three switch arms 14, 15 and 16 is put into electrical contact with a separate segment 35, 36 and 37 and the pivots of these switch members, to-wit, the pivots 17, 18 and 19 are automatically placed in electrical contact with the contacts 34 connected to a common conductor.

By reference to Fig. 5 it will be seen that this completes the electrical circuits of the lamps 1, 2 and 3 and the lights will be lighted assuming, of course, that the supply circuit is energized and that the switch to the testing device is closed. Numbers are placed on the contact segments 35, 36 and 37 corresponding to the numbers of the lights so that the circuit to each of the switch members may be readily identified by its particular lights 1, 2 or 3.

After a switch has been placed in position on the testing device above described, the motor 30 is started and its speed gradually increased, its speed being constantly under observation or being recorded by a tachometer 73 (Fig. 5) having a dial 74 that may be either an indicating or a recording dial. As the speed of the motor increases the centrifugal force tends to throw the switch members 14, 15 and 16 away from the segments 35, 36 and 37 and when this force is sufficient to overcome the springs 20 of the respective switch members they will be thrown out of contact with said segments and the circuit to the lamps 1, 2 and 3 will be broken. The switch arms may be thrown out individually or two of them may be thrown out at the same time or the entire three may be thrown out together, the latter being the desired action. The instant that the circuit of any one of the lights is broken the light is extinguished which effect is readily apparent to the eye and at that time the speed of the motor may be noted on the indicator or may be recorded on the record if the tachometer is a recording one. In this manner the tester may determine very quickly at what speed the respective switch members throw out. By placing the dial of the tachometer close to the lights 1, 2, and 3, for example, on the same panel board, it is easy to watch the speed of the motor and at the same time determine the switch members throw out because the extinguishing of one or more of the lights may be seen while the eye is watching the tachometer. Usually the tachometer is provided with a mark at the speed at which it is desired to have the switch members throw out. The operator, therefore, can watch the needle of the tachometer and note whether the lights are all extinguished at the particular desired speed. If not, he will know whether the lights went out before the speed was reached or after it and which of them went out so that the particular switch member may be adjusted to operate in the proper manner.

It will be readily appreciated that this method of testing the switches enables each of the switch members to be tested individually after which it may be adjusted to make its action correspond to that desired. The testing may be done very rapidly by quickly placing a switch on the end of the testing device, clamping it in position and starting the motor. The motor soon gains enough speed to throw out the switches and the operator quickly determines whether the switch is satisfactory or not. With the present device switches may be tested ever so much more rapidly and accurately than was previously possible by old-fashioned hand methods.

The use of lights as indicators is preferable because of the quickness with which the eye grasps the fact that the lights have been extinguished. It will be clear, of course, that they could be operated in a reverse manner, that is, the connections could be arranged so that the lights would be lighted instead of being extinguished when the switch members are operated.

It is to be understood that the construction shown is for purposes of illustration only and that variations may be made in it without departing from the spirit and scope of the invention as defined by the appended claims.

I claim:

1. A testing device for centrifugal switches comprising means for detachably receiving a switch, means acting to rotate said receiving means with gradually increasing speed, an electrical circuit controlled by said switch, an indicating device in said circuit to indicate when said switch is operated, and means for measuring the speed of rotation of the switch at the instant said indicating device is operated.

2. A testing device for centrifugal switches that have a plurality of switch members, comprising means for detachably receiving a switch, means acting to rotate said receiving means with gradually increasing speed, an electrical circuit for each switch member, an indicating device in each circuit for giving an indication when the switch of its circuit is operated, and means for measuring the speed of rotation of said switch at the instant each electrical indicator is operated.

3. A testing device for centrifugal switches having a plurality of switch members, comprising a support upon which a switch may be quickly clamped in position, electrical contacts on said support automatically engaging the switch members of said switch as it is placed in position on the testing device to cause an electric circuit containing an indicator to be closed for each of said switch members, means for rotating said shaft at increasing speed to throw out the members of said centrifugal switch, and means for measuring the speed of rotation of said shaft at the instant each switch member is thrown out.

4. A testing device for centrifugal switches having a plurality of switch members, comprising a support upon which a switch may be quickly mounted and clamped in position, means automatically engaging the members of said switch to position them in the position they are to occupy when the switch is used, electrical contacts on said support automatically engaging said switch members as the switch is placed in position on the testing device to cause each switch member to complete a circuit containing an electrical indicator, means for rotating said support with increasing speed to throw out said switch members to break their circuits, and means for indicating the speed of rotation of said support at the instant each of the switch members is thrown out.

5. A testing device for centrifugal switches having a plurality of switch members, comprising a shaft upon which a switch may be quickly mounted and clamped in position, a set of contacts carried by a plate on said shaft for engaging the members of said switch to position them in the position they are to occupy when the switch is in use, a second set of contacts carried by said plate for automatically engaging said switch members as the switch is placed on said shaft to complete an electrical circuit for each switch member, an indicator in each circuit, an electric motor for rotating said shaft with increasing speed, and means for indicating the speed of said shaft at the instant each of the switch members is thrown out.

6. A testing device for centrifugal switches having a plurality of switch members, comprising a shaft upon which a switch may be mounted, clamping means for clamping the switch in position on said shaft, an insulating disc carried by the shaft, a set of segmental contacts on said disc adapted to engage the members of the switch as it is placed on the shaft to position said members in the position they are to occupy under conditions of use, a second set of contacts carried by said plate automatically engaging said switch members as the switch is placed on said shaft to complete a circuit for each switch member in which an electrical indicator is located, said circuits being completed through slip rings on said shaft, means for rotating the shaft at increasing speed, and means for indicating the speed of said shaft at the instant each of the switch members is thrown out.

In testimony whereof, I have subscribed my name.

AURILE T. SMITH.